United States Patent
Baker et al.

(10) Patent No.: US 9,436,747 B1
(45) Date of Patent: *Sep. 6, 2016

(54) QUERY GENERATION USING STRUCTURAL SIMILARITY BETWEEN DOCUMENTS

(71) Applicant: Google Inc., Mountain View, CA (US)

(72) Inventors: Steven D. Baker, Palo Alto, CA (US); Michael E. Flaster, Menlo Park, CA (US); Nitin Gupta, Santa Clara, CA (US); Paul Haahr, San Francisco, CA (US); Srinivasan Venkatachary, Sunnyvale, CA (US); Yonghui Wu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/750,483

(22) Filed: Jun. 25, 2015

Related U.S. Application Data

(63) Continuation of application No. 13/620,500, filed on Sep. 14, 2012, now Pat. No. 9,092,479, which is a continuation of application No. 12/942,950, filed on Nov. 9, 2010, now Pat. No. 8,346,792.

(51) Int. Cl.
*G06F 17/30* (2006.01)
*G06F 17/24* (2006.01)

(52) U.S. Cl.
CPC ....... *G06F 17/30563* (2013.01); *G06F 17/248* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 5,920,854 A | 7/1999 | Kirsch |
| 5,963,932 A | 10/1999 | Jakobsson |
| 6,006,222 A | 12/1999 | Culliss |
| 6,006,225 A | 12/1999 | Bowman |
| 6,014,665 A | 1/2000 | Culliss |

(Continued)

FOREIGN PATENT DOCUMENTS

| | | |
|---|---|---|
| WO | WO0077689 A1 | 12/2000 |
| WO | WO0167297 A1 | 9/2001 |

OTHER PUBLICATIONS

Boyan, J. et al., "A Machine Learning Architecture for Optimizing Web Search Engines," School of Computer Science, Carnegie Mellon University, May 10, 1996, pp. 1-8.

(Continued)

*Primary Examiner* — Syed Hasan
(74) *Attorney, Agent, or Firm* — Fish & Richardson P.C.

(57) ABSTRACT

Methods, systems, and apparatus, including computer program products, for generating synthetic queries using seed queries and structural similarity between documents are described. In one aspect, a method includes identifying embedded coding fragments (e.g., HTML tag) from a structured document and a seed query; generating one or more query templates, each query template corresponding to at least one coding fragment, the query template including a generative rule to be used in generating candidate synthetic queries; generating the candidate synthetic queries by applying the query templates to other documents that are hosted on the same web site as the document; identifying terms that match structure of the query templates as candidate synthetic queries; measuring a performance for each of the candidate synthetic queries; and designating as synthetic queries the candidate synthetic queries that have performance measurements exceeding a performance threshold.

20 Claims, 9 Drawing Sheets

(56) References Cited

U.S. PATENT DOCUMENTS

| | | | |
|---|---|---|---|
| 6,078,916 | A | 6/2000 | Culliss |
| 6,169,986 | B1 | 1/2001 | Bowman |
| 6,182,068 | B1 | 1/2001 | Culliss |
| 6,185,559 | B1 | 2/2001 | Brin |
| 6,275,820 | B1 | 8/2001 | Navin |
| 6,285,999 | B1 | 9/2001 | Page |
| 6,321,228 | B1 | 11/2001 | Crandall |
| 6,353,849 | B1 | 3/2002 | Linsk |
| 6,366,934 | B1 | 4/2002 | Cheng |
| 6,424,980 | B1 | 7/2002 | Iizuka |
| 6,526,440 | B1 | 2/2003 | Bharat |
| 6,529,903 | B2 | 3/2003 | Smith |
| 6,539,377 | B1 | 3/2003 | Culliss |
| 6,564,213 | B1 | 5/2003 | Ortega |
| 6,567,103 | B1 | 5/2003 | Chaudhry |
| 6,601,061 | B1 | 7/2003 | Holt |
| 6,615,209 | B1 | 9/2003 | Gomes |
| 6,658,423 | B1 | 12/2003 | Pugh |
| 6,678,681 | B1 | 1/2004 | Brin |
| 6,684,204 | B1 | 1/2004 | Lal |
| 6,721,736 | B1 | 4/2004 | Krug |
| 6,725,259 | B1 | 4/2004 | Bharat |
| 6,728,704 | B2 | 4/2004 | Mao |
| 6,732,086 | B2 | 5/2004 | Plow |
| 6,732,087 | B1 | 5/2004 | Hughes |
| 6,738,764 | B2 | 5/2004 | Mao |
| 6,745,178 | B1 | 6/2004 | Emens |
| 6,754,873 | B1 | 6/2004 | Law |
| 6,826,559 | B1 | 11/2004 | Ponte |
| 6,832,218 | B1 | 12/2004 | Emens |
| 6,847,972 | B1 | 1/2005 | Vernau |
| 6,853,993 | B2 | 2/2005 | Ortega |
| 6,873,982 | B1 | 3/2005 | Bates |
| 6,877,002 | B2 | 4/2005 | Prince |
| 6,990,453 | B2 | 1/2006 | Wang |
| 7,051,014 | B2 | 5/2006 | Brill |
| 7,058,624 | B2 | 6/2006 | Masters |
| 7,152,061 | B2 | 12/2006 | Curtis |
| 7,165,080 | B2 | 1/2007 | Kotcheff |
| 7,206,780 | B2 | 4/2007 | Slackman |
| 7,277,928 | B2 | 10/2007 | Lennon |
| 7,574,426 | B1 | 8/2009 | Ortega |
| 7,689,615 | B2 | 3/2010 | Burges |
| 7,756,857 | B2 | 7/2010 | Wan |
| 8,145,623 | B1 | 3/2012 | Mehta |
| 9,208,232 | B1 * | 12/2015 | Tirumalareddy . G06F 17/30864 |
| 2002/0042791 | A1 | 4/2002 | Smith |
| 2002/0049752 | A1 | 4/2002 | Bowman |
| 2002/0069190 | A1 | 6/2002 | Geiselhart |
| 2002/0078020 | A1 | 6/2002 | Lawton |
| 2002/0123988 | A1 | 9/2002 | Dean |
| 2002/0129014 | A1 | 9/2002 | Kim |
| 2002/0133481 | A1 | 9/2002 | Smith |
| 2002/0143659 | A1 | 10/2002 | Keezer |
| 2002/0147711 | A1 * | 10/2002 | Hattori ............. G06F 17/30938 |
| 2002/0169754 | A1 | 11/2002 | Mao |
| 2003/0018612 | A1 | 1/2003 | Melbin |
| 2003/0028890 | A1 | 2/2003 | Swart |
| 2003/0033298 | A1 | 2/2003 | Sundaresan |
| 2003/0037074 | A1 | 2/2003 | Dwork |
| 2003/0078914 | A1 | 4/2003 | Witbrock |
| 2003/0120654 | A1 | 6/2003 | Edlund |
| 2003/0149686 | A1 | 8/2003 | Drissi |
| 2003/0229640 | A1 | 12/2003 | Carlson |
| 2004/0024739 | A1 | 2/2004 | Copperman |
| 2004/0039734 | A1 | 2/2004 | Judd |
| 2004/0119740 | A1 | 6/2004 | Chang |
| 2004/0122811 | A1 | 6/2004 | Page |
| 2004/0153472 | A1 | 8/2004 | Rieffanaugh, Jr. |
| 2004/0186828 | A1 | 9/2004 | Yadav |
| 2004/0215607 | A1 | 10/2004 | Travis |
| 2005/0027670 | A1 | 2/2005 | Petropoulos |
| 2005/0027687 | A1 | 2/2005 | Nowitz |
| 2005/0027691 | A1 | 2/2005 | Brin |
| 2005/0033803 | A1 | 2/2005 | Vleet |
| 2005/0044070 | A1 | 2/2005 | Nagata |
| 2005/0050014 | A1 | 3/2005 | Gosse |
| 2005/0060311 | A1 | 3/2005 | Tong |
| 2005/0071465 | A1 | 3/2005 | Zeng |
| 2005/0240570 | A1 | 10/2005 | Ozbutun |
| 2005/0256848 | A1 | 11/2005 | Alpert |
| 2006/0212429 | A1 | 9/2006 | Bruno |
| 2006/0218114 | A1 | 9/2006 | Weare |
| 2006/0224554 | A1 | 10/2006 | Bailey |
| 2006/0230022 | A1 | 10/2006 | Bailey |
| 2006/0294071 | A1 | 12/2006 | Weare |
| 2007/0011154 | A1 | 1/2007 | Musgrove |
| 2007/0088692 | A1 | 4/2007 | Dean |
| 2007/0150800 | A1 | 6/2007 | Betz |
| 2007/0203890 | A1 | 8/2007 | Sareen |
| 2007/0208755 | A1 * | 9/2007 | Bhatkar .................. G06F 21/31 |
| 2008/0065632 | A1 | 3/2008 | Nam |
| 2008/0082477 | A1 | 4/2008 | Dominowska |
| 2008/0167973 | A1 | 7/2008 | De Marcken |
| 2008/0263026 | A1 | 10/2008 | Sasturkar |
| 2008/0313017 | A1 | 12/2008 | Totten |
| 2009/0070284 | A1 | 3/2009 | Tunstall-Pedoe |
| 2009/0089286 | A1 | 4/2009 | Kumar |
| 2009/0210406 | A1 | 8/2009 | Freire |
| 2010/0161385 | A1 | 6/2010 | Karypis |
| 2011/0078193 | A1 | 3/2011 | Chen |

OTHER PUBLICATIONS

Brin, S. et al., "The Anatomy of a Large-Scale Hypertextual Web Search Engine", Computer Science Department, 1998.

Sahami, M. et al., T. D. 2006. A web-based kernel function for measuring the similarity of short text snippets. In Proceedings of the 15th International Conference on World Wide Web (Edinburgh, Scotland, May 23-26, 2006). WWW '06. ACM Press, New York, NY, pp. 377-386.

Ricardo A. Baeza-Yates et al., The Intention Behind Web Queries. SPIRE, 2006, pp. 98-109, 2006.

Smith et al. "Leveraging the structure of the Semantic Web to enhance information retrieval for proteomics," vol. 23, Oct. 7, 2007, 7 pages.

Robertson, S.E "Documentation Note on Term Selection for Query Expansion" J. of Documentation, 46(4): Dec. 1990, pp. 359-364.

Talel Abdessalem, Bogdan Cautis, and Nora Derouiche. 2010. ObjectRunner: lightweight, targeted extraction and querying of structured web data. Proc. VLDB Endow. 3, 1-2 (Sep. 2010).

Jane Yung-jen Hsu and Wen-tau Yih. 1997. Template-based information mining from HTML documents. In Proceedings of the fourteenth national conference on artificial intelligence and ninth conference on Innovative application of artificial intelligence (AAAI'97/IAAI'97). AAAI Press, pp. 256-262.

Ganesh, Agarwal, Govind Kabra, and Kevin Chen-Chuan Chang. 2010. Towards rich query interpretation: walking back and forth for mining query templates. In Proceedings of the 19th international conference on World wide web (WWW '10). ACM, New York, NY USA, 1-10. DOI=10. 1145/1772690. 1772692 http://doi.acm.org/10.1145/1772690.1772692.

* cited by examiner

QUERY GENERATION USING STRUCTURAL SIMILARITY BETWEEN DOCUMENTS

CROSS-REFERENCE TO RELATED APPLICATIONS

This application is a continuation application of and claims priority to U.S. patent application Ser. No. 13/620,500, titled "QUERY GENERATION USING STRUCTURAL SIMILARITY BETWEEN DOCUMENTS," which was filed on Sep. 14, 2012, which claims priority to U.S. patent application Ser. No. 12/942,950, now U.S. Pat. No. 8,346,792, titled "QUERY GENERATION USING STRUCTURAL SIMILARITY BETWEEN DOCUMENTS," which was filed on Nov. 9, 2010. The disclosure of each of the foregoing applications is incorporated herein by reference.

BACKGROUND

This specification relates to generating search queries.

The Internet provides access to a wide variety of resources, e.g., video and/or audio files, webpages for particular subjects, news articles, and so on. A search engine identifies resources of particular interest to a user in response to a user query. The user query includes one or more search terms, and the search engine uses these terms to identify documents that are responsive to the user query.

When performing a search, a user may not clearly express his or her need for information. For example, the user may provide a query that is very broad, is ambiguous, or is otherwise vague. Accordingly, the search engine may return results that are not of interest to the user, or do not fully satisfy the user's need for information. In contrast, a well-formulated query is a query that contains terms that result in the search engine identifying resources that address the user's intent, as measured by one or more performance metrics. For example, for both a vague query and a well-formulated query, the search engine may identify resources that satisfy the user's interest. However, for the vague query, search results that link to the resources that satisfy the user's need for information may not be highly ranked, and may not even be presented on a first page of search results. Conversely, for a well-formulated query, the search results that link to these resources are highly ranked.

Conventional technologies allow a search engine to identify well-performing queries from queries entered by users. The search engine recognizes well-performing queries. Well-performing queries can be, for instance, queries with results that many users have selected. These well-performing queries can then be suggested to users when the users provide queries to the search engine.

While the process of determining which queries provided by users are well-performing queries and using these queries and variations of these queries as query suggestions works well, the process only works on existing well-performing queries. As a result, the process may not identify other types of queries that may be well-performing queries if the other types of queries are not the underlying well-performing queries, or variations of those well-performing queries.

SUMMARY

Techniques of generating queries from seed queries and from documents associated with the seed queries are described. One aspect of the subject matter described in this specification can be embodied in methods that include the actions of receiving a set of seed queries associated with a structured document, the structured document including embedded coding and being hosted on a website; identifying embedded coding fragments from the structured document and the seed queries associated with the structured document; generating one or more query templates, each query template corresponding to at least one identified embedded coding fragment, the query template including a generative rule to be used in generating one or more candidate synthetic queries; generating the one or more candidate synthetic queries using the query templates and other structured documents hosted on the website; measuring performance in a search operation of each of the one or more candidate synthetic queries; designating as a synthetic query a candidate synthetic queries that have performance measurements exceeding a performance threshold; and storing the designated synthetic query in a query store. Other embodiments of this aspect include corresponding systems, apparatus, and computer program products.

These and other embodiments can optionally include one or more of the following features. Embedding coding of the structured document can include hypertext markup language (HTML) tags. Identifying the embedded coding fragments from the structured document can include identifying an HTML tag pair. Identifying the embedded coding fragments from the structured document can include identifying at least a portion of content enclosed by the HTML tag pair; identifying a query term in the seed queries; and identifying the embedded coding fragments when the portion of content matches the query term. The generative rule causes the data processing apparatus to generate one or more candidate synthetic queries from the other structured documents based at least in part on the embedded coding fragments. Generating the query templates can include: for at least one of the embedded coding fragments, counting a number of other structured documents hosted on the website that include the embedded coding fragment; and generating the query template for the embedded coding fragment in response to determining that the number of other structured documents hosted on the website including the embedded coding fragment satisfies a template qualification value.

The query template can include at least one of a literal and a wildcard, the literal including a literal phrase found in the structured document and the wildcard including a type and at least one constraint. The type can indicate a category of terms. The constraint can indicate a context within which the terms appear in the structured document. The context within which the terms appear in the structured document can be based on various parameters. The parameters can include, for example, a count of a number of times the terms appear in the structured document, surrounding HTML tags; words or phrases that are close to one another, inverse document frequency (IDF) of the terms, among others. Generating the candidate synthetic queries can include: applying the query templates to the other structured documents (e.g., structured documents hosted on the website or a collection of websites); identifying other embedded coding fragments of the other structured documents that match the embedded coding fragments identified in the query templates; and designating content in the other embedded coding fragments as the candidate synthetic queries. The match can include an exact match, an approximate match, or both. Measuring the performance of each of the candidate synthetic queries comprises computing a score of the candidate synthetic query in relation to the structured document. The score can be an information retrieval (IR) score.

In some implementations, the method can further include aggregating the query templates generated from one or more structured documents from a website. Aggregating the query templates can include determining a template threshold, the template threshold proportional to a total number of structured documents (e.g., structured documents hosted on the website), such that a template can be selected if the template appears at least the threshold number of times in the number of structure documents; scoring each query template based on a number of occurrences that the embedded coding fragment of the query template appears in the website; and aggregating the query templates that have scores satisfying the template threshold.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Figure 1:
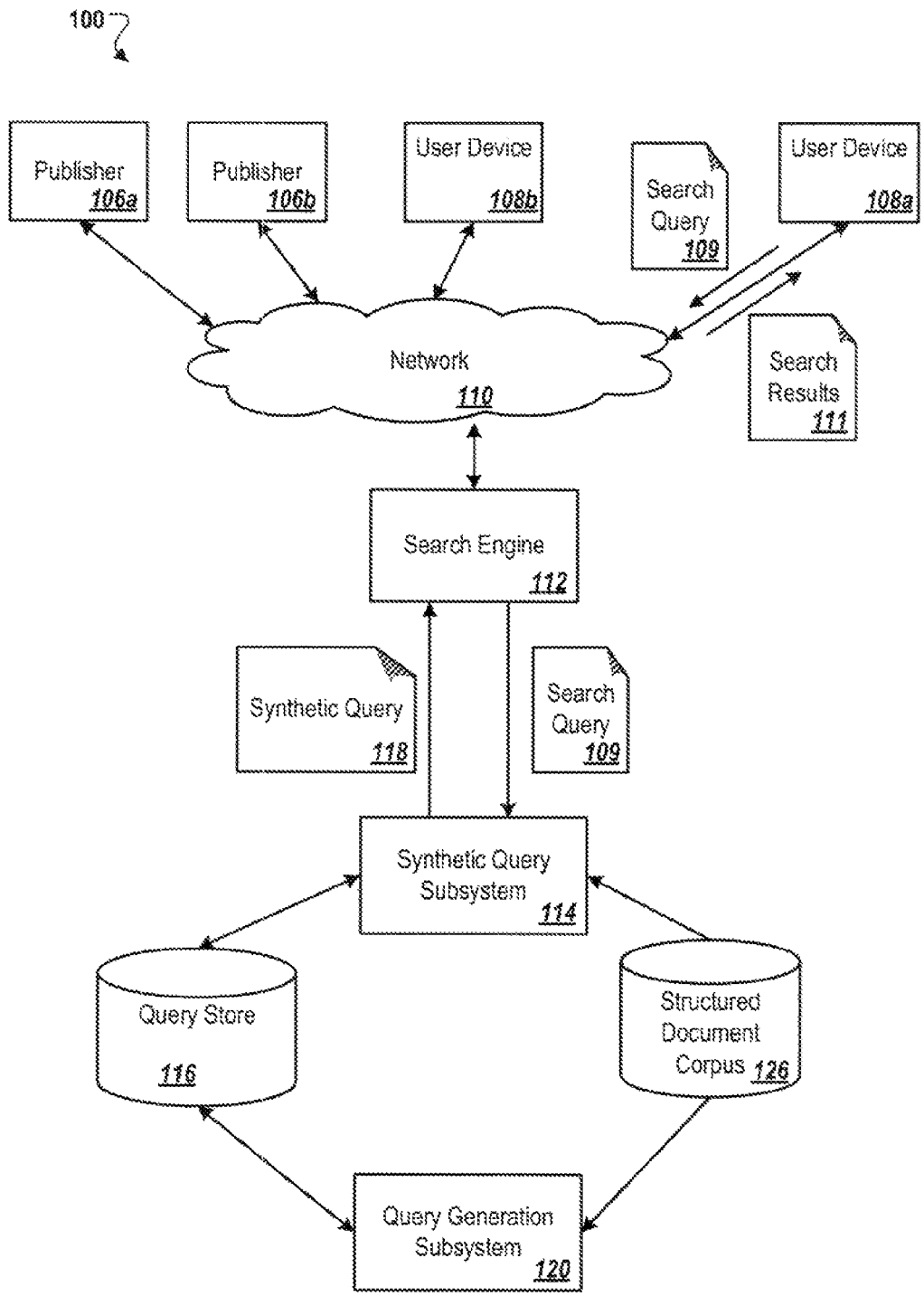
FIG. 1 is a block diagram of an example environment in which a system for generating synthetic queries using structural similarity between documents can be is implemented.

The subject matter of this specification relates to generating synthetic queries using structural similarities between structured documents (e.g., Hypertext Markup Language (HTML) documents). The synthetic queries are computer-generated queries that are stored for later use. These later uses may include augmenting user queries during searches, extracting keywords for content targeting, suggesting new search queries to users, for example, either as query refinements or in other user interfaces, or for even generating more synthetic queries.

The techniques described in this specification can be used to generate a synthetic query that is expected to perform well in locating desirable documents. The synthetic query is generated by use of one or more seed queries. Seed queries can be other machine generated synthetic queries or user queries that were provided by users anonymously. For queries that are provided by users, the performance of the query can be determined from anonymous user interactions. If the query is determined to perform well, it can be selected as a seed query. For example, if many users that enter the same query often select one or more of the search results relevant to the query, that query is can be designated as a seed query. The documents that are referenced by the often-selected search results are also designated as documents corresponding to the seed query.

The seed queries are used for generating synthetic queries. For example, a synthetic query can be generated by mining a corpus of structured documents. A document in the corpus is selected, as is a seed query that has been provided by one or more users. If the seed query contains certain terms that are located at various locations or in various structures of its corresponding document, it is likely that words, phrases, or text segments located in similar locations or structures in a second document may constitute a synthetic query corresponding to the second document. The words, phrases, or text segments are extracted from the second document, designated as candidate synthetic queries, and are evaluated. The evaluation of the candidate synthetic queries can be measured, for example, using information retrieval (IR) scores in relation to one or more documents. If a candidate synthetic query performs sufficiently well, as measured by one or more predefined criteria, the candidate synthetic query is designated as a synthetic query.

These new synthetic queries can be stored in a query data store. One example use of the new synthetic queries is query refinement. The search engine can suggest one or more refined queries to a user for the user to select. Additionally or alternatively, when a user submits a query to a search engine, the terms of the submitted query can be evaluated and matched to terms of the stored synthetic queries to select one or more similar synthetic queries. The selected synthetic queries, in turn, can be used by the search engine to augment the search operation, thereby obtaining better search results for the user. For example, search results obtained by a similar synthetic query can be presented to the user along with the search results obtained by the user query.

§1.1 Example Operating Environment

FIG. 1 is a block diagram of an example environment 100 in which a system for generating synthetic queries using structural similarity between documents is implemented. In the environment 100, a search engine 112 identifies resources responsive to queries in the form of search results. A computer network 110, such as a local area network (LAN), wide area network (WAN), the Internet, or a combination thereof, connects publishers 106a and 106b, user devices 108a and 108b and a search engine 112. Example user devices 108a and 108b include personal computers, mobile communication devices, television set-top boxes, etc. Although only two publishers (106a and 106b) and two user devices (108a and 108b) are shown, the online environment 100 may include many more publishers and user devices.

§1.2 Search Processing

The publishers 106a and 106b include general content servers that receive requests for content (e.g., webpages or documents related to articles, discussion threads, music, video, graphics, other webpage listings, information feeds, product reviews, etc.), and retrieve the requested content in response to the request. For example, content servers related to news content providers, retailers, independent blogs, social network sites, products for sale, or any other entity that provides content over the network 110 can be publishers.

A user device, such as user device 108a, submits a query 109 to the search engine 112. In response to receiving the query from the user device 108a, the search engine 112 identifies responsive resources, generates search results 111 that identify the responsive resources and provides the search results to the user device. Each search result 111 identifies a resource that is responsive to a query and includes a link to the resource. A search result 111 can include a web page title, a snippet of text or a portion of an image (or thumbnail of the image) extracted from the web page, and the URL of the web page. The search engine 112 provides the search results 111 to the user device 108a, and the user of the user device can thereafter select particular search results 111 to access the corresponding resources.

§1.3 Synthetic Query Subsystem

An example use of a synthetic query is augmenting a user's search query. As described above, users often provide queries that cause a search engine 112 to return results that are not of interest to the users, or do not fully satisfy the users' need for information. Accordingly, a synthetic query subsystem 114 can be used to generate queries that can augment the user's search queries.

In operation, the search engine 112 receives a query from a user device and forwards the query 109 to the synthetic query subsystem 114 for evaluation. The synthetic query subsystem 114 then parses the search terms in the query 109 and compares the parsed terms to queries stored in a query store 116 that stores seed queries. In some implementations, the seed queries are queries submitted by users anonymously. The queries have been identified as performing well. The seed queries can also include machine-generated synthetic queries that have been previously generated by the query generation subsystem 120, as described below. Each seed query can be associated with one or more search results and/or documents. Likewise, each document can be associated with one or more seed queries. The synthetic query subsystem 114 can then identify one or more relevant synthetic queries that can be used in addition to the submitted query to perform an augmented search operation to augment the search results provided to the user.

The synthetic query subsystem 114 uses the synthetic query 118 to perform an augmented search operation for the query 109. The results of the augmented search operation can be provided to the user device that submitted the query 109. In some implementations, the augmented search operation provides query suggestions for a query received from the user device. Other augmented search operations include providing to the user device 108 additional search results identified by the synthetic query 118, or adjusting the rankings of search results identified by the query 109, to name just a few.

To obtain synthetic queries to be used by the synthetic query subsystem 114, a query generation subsystem 120 analyzes data from a structured document corpus 126 to generate synthetic queries. By analyzing documents that include structured data (e.g., HTML tags), the query generation subsystem 120 can create synthetic queries that will likely perform well. The synthetic queries that are generated may not otherwise be present in the query store 116. For example, a machine-generated synthetic query can be a query that has never been entered by a user, and therefore has unknown performance quality as the query has no performance history.

The synthetic query subsystem 114 and query generation subsystem 120 are described in detail below. The implementations described below are examples, and other implementations can also be used.

§2.0 Synthetic Query Generation

Figure 2:
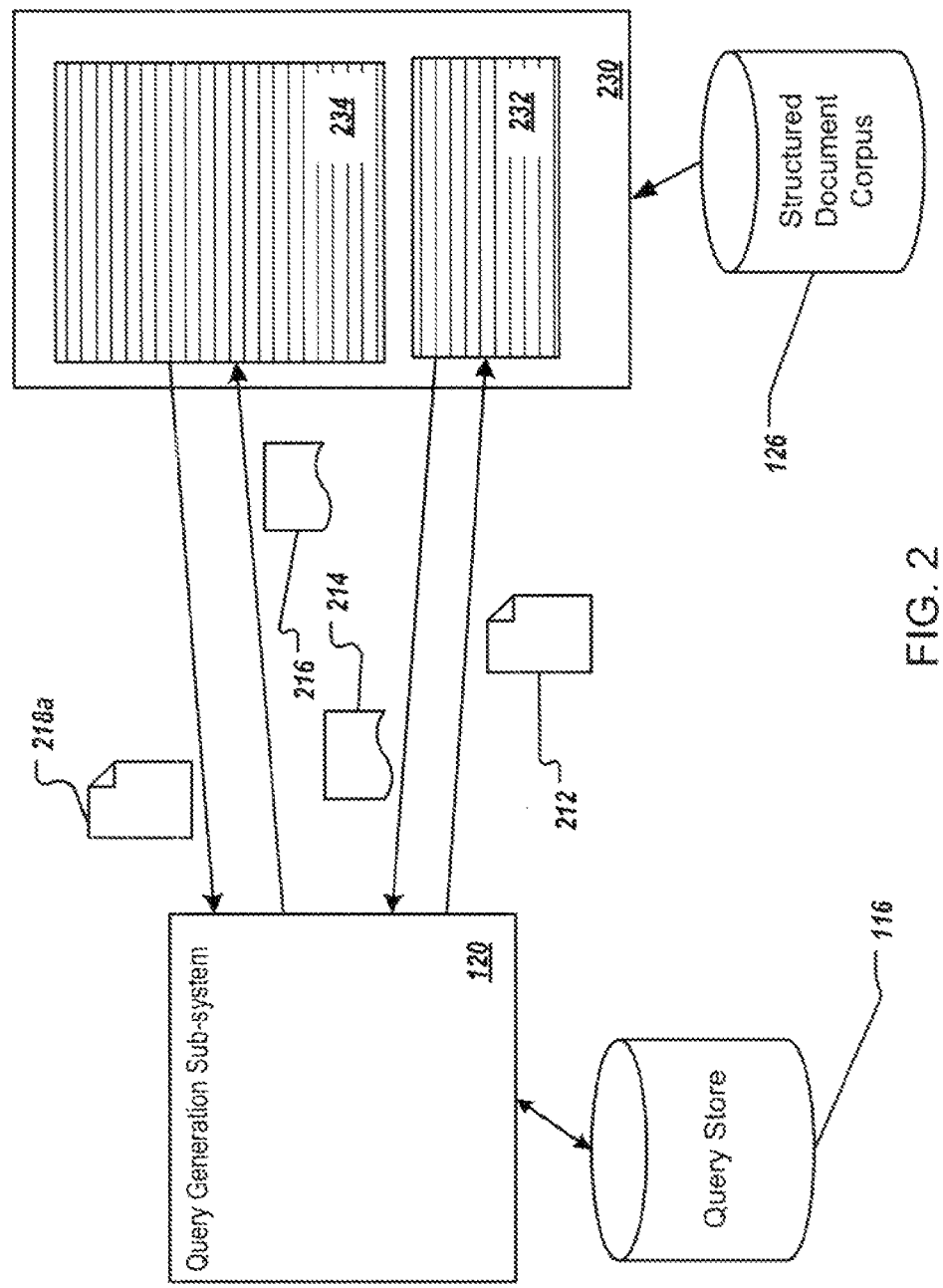
FIG. 2 is a block diagram of an example query generation subsystem that generates synthetic queries using structural similarity.

Synthetic queries can be generated from a corpus of structured documents and historical queries, or a corpus of structured documents and existing synthetic queries, using a set of query generating rules. FIG. 2 is a block diagram of an example query generation module that generates synthetic queries using structural similarity between documents.

§2.1 Synthetic Query Identification

FIG. 2 is a block diagram of the example query generation subsystem 120 that generates synthetic queries using structural similarity. The query generation subsystem 120 interacts with a query store 116 and the structured document corpus 126 as described below.

§2.2 Candidate Synthetic Query Identification

The query generation subsystem 120 accesses the query store 116 to acquire a set of existing seed queries. The seed queries are associated with a set of documents in structured document corpus 126. The association is based on document retrieval. For example, if a particular seed query is known to be a well-performing query for a particular document, the seed query is stored with a reference to that document.

In FIG. 2, the query generation subsystem 120 targets a particular subset 230 of documents of structured document corpus 126. Subset 230 can include structured documents that have certain common traits that are shared among the documents within the subset 230. For example, subset 230 includes documents that are hosted on one or more servers that can be addressed using a common domain name or an Internet Protocol (IP) address (e.g., hosted on a same website). In some implementations, subset 230 includes documents that are referred to within a website (e.g., a website hosting documents that contain hyperlinks to the documents in subset 230). The documents can include static documents (e.g., documents in HTML or Extensible Markup Language (XML) format), as well as dynamic documents (e.g., documents dynamically generated using Java Sever Pages (JSP) or PHP: Hypertext Preprocessor (PHP) technologies).

A portion 232 of the structured documents in subset 230 includes documents associated with the seed queries stored in the query store 116. The portion 232 can be less than entire set of documents in the subset 230, i.e., the portion 232 can be a proper subset of the subset 230. Another portion 234 of the structured documents that are not associated with the seed queries associated with the portion 232 is also identified. Based on the structural similarity of the documents in the portion 232 to the documents in the portion 234, and on the specific sections of the documents in the portion 232 that are relevant to the associated seed queries in the query store 116, the query generation subsystem 120 generates synthetic queries from the documents in the portion 232 and the portion 234.

Seed queries 212 that are associated with the portion of the structured documents 232 (e.g., seed queries 212 that have been used to retrieved the structured documents in the past) each have one or more query terms. Query generation subsystem 120 analyzes the structural characteristics of query terms as they appear in the portion of the structured documents 232. The query generation subsystem 120 can apply the seed queries 212 to the structured documents 232 to identify structures in which the query terms of seed queries 212 appear.

A "structure" of the structured document is a particular formatting element based on which the structured document is organized. The structure can include markups of the document. For example, the structure can include metadata of the content (e.g., an annotation of a segment in the document that includes information of the segment). A structure in an HTML document can also include a tag structure, as well as some or all text fragments in the tag structure. The structure can have various forms, including hierarchical forms in which tags are nested in another tag.

For example, a particular seed query 212 contains query terms "Dorothy Parker." The particular seed query 212 is associated with a particular HTML document (e.g., a webpage). The HTML document contains an embedded coding fragment "<h1>Dorothy Parker-Biography<h1>." The tag pair <h1> and </h1> (which define a large heading size in HTML), as well as text fragments "-Biography" included in the tag pair, can be extracted from the embedded coding fragment and used for generating more synthetic queries.

By applying query terms of seed queries 212 to structured documents 232, the query generation subsystem 120 acquires a set of structures 214 (e.g., "<h1>[ . . . ]-Biography</h1>", where the terms in the brackets relate to the seed queries 212). The structures 214 are referred to as embedded coding fragments, as the structures can include coding fragments (e.g., HTML tags) that are embedded in the documents 232 that are associated with seed queries 212.

From these structures 214, the query generation subsystem 120 generates a set of query templates 216. Each query template 216 includes one or more of the identified structures 214 that are then used to produce candidate synthetic queries from the structured documents 234. In some implementations, the query templates 216 do not include the text or information that is specific to the seed query 212 that resulted in the structure 214 being identified.

The query generation subsystem 120 applies the query templates 216 to the subset 230 of the structured documents (e.g., the webpages of a website), including portions 234 and 232. Applying query templates 216 to the entire subset 230 of the structured documents generates a set of candidate synthetic queries 218. When applying the query templates 216 to the subset 230 of the structured documents, the query generation subsystem 120 uses the templates 216 to extract words, phrases, or text segments that match the structures as defined in query templates 216.

In some implementations, the query templates 216 include generative rules that can be used to extract words, phrases, or text segments from embedded coding that match one or more formats defined by the generative rules in the query templates. Applying the query templates 216 and the generative rules to structured documents 234 extracts embedded coding fragments that structurally similar to the embedded coding fragments found in the structured documents 232. For example, query templates 216 identify HTML structure "<h1>[ . . . ]-Biography</h1>" as a coding fragment to be used to identify other terms in a document. The generative rule specifies that any text within the brackets is also extracted as a candidate synthetic query. One of the structured documents 234 contains a structure "<h1>Sylvia Plath-Biography</h1>," which is structurally similar to "<h1>Dorothy Parker-Biography</h1>" in that both of the structures have the same form "<h1>[ . . . ]-Biography</h1>." Query generation subsystem 120 can identify the terms "sylvia plath" as a candidate synthetic query 218. In various implementations, the candidate synthetic queries can be case-insensitive or case sensitive.

In various implementations, identifying embedded coding fragments using existing seed queries and documents includes identifying embedded coding fragments using literals or identifying embedded coding fragments using wildcards from query-document pairs. A query-document pair includes a seed query and either a structured document or a reference to a structured document. From history data, the structured document results in a well-performing seed query (e.g., a structured document that users tend to access often when the structured document is returned by a search engine in response to the seed query). Examples that include further details on some of these identifying processes are described below with respect to FIG. 3 and FIG. 4.

§2.3 Query Template Structure and Generation

Figure 3:
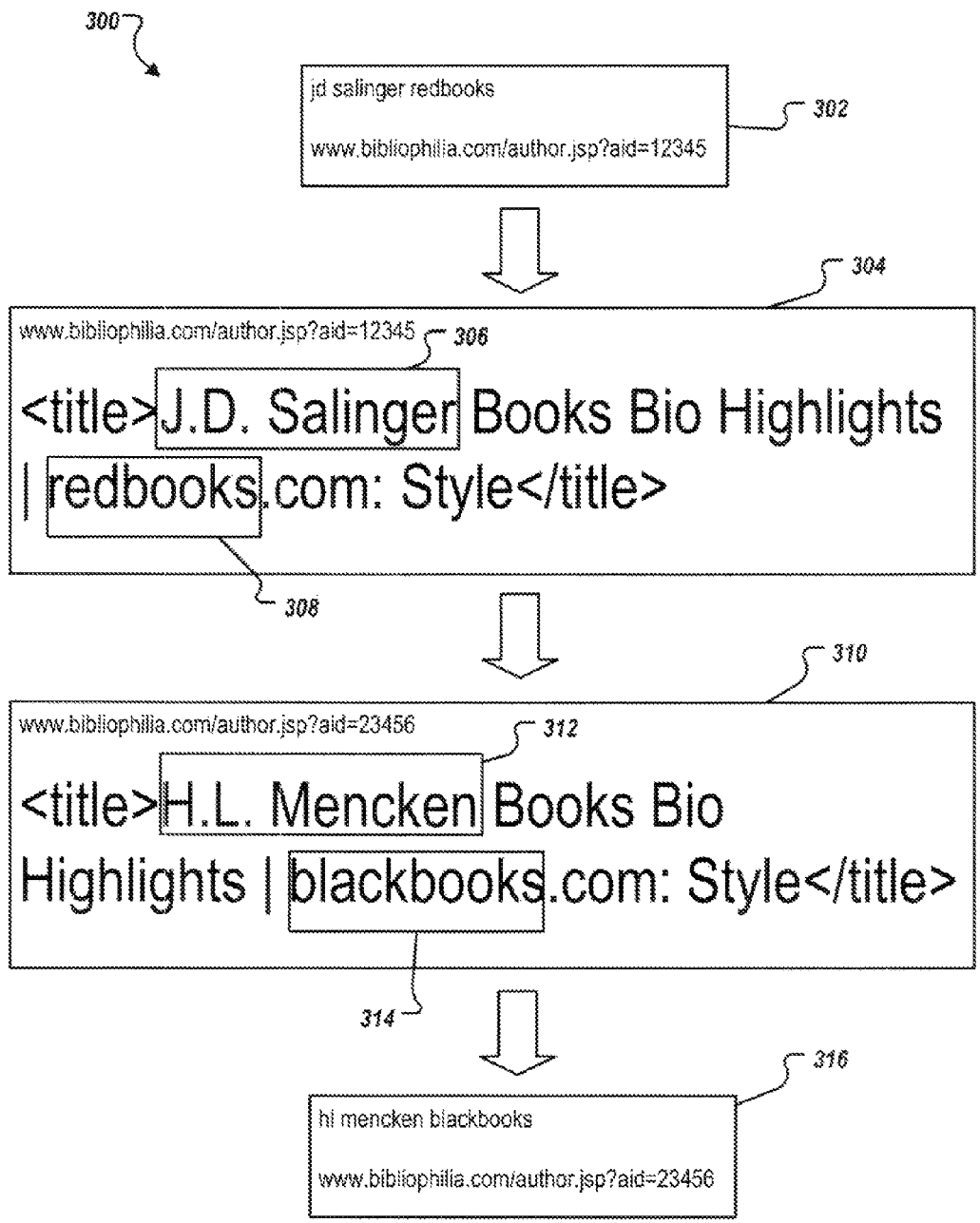
FIG. 3 is a block diagram of example implementations of query generation techniques using structural similarity based on literals.

FIG. 3 is a block diagram 300 of example implementations of query generation techniques using structural similarity based on literals. Literals, as used in context of identifying coding segments for generating synthetic queries, include strings of words, phrases, or text segments. In various implementations, at least portions of the strings of literals are parts of the existing seed queries, parts of the documents associated with the seed queries (e.g., documents that were retrieved by the seed queries and confirmed, based on historical data, to be validly related to the seed queries), or both.

Box 302 includes an example query-document pair. The query in the query-document pair includes query terms "jd salinger redbooks," which, in various implementations, can be case sensitive or case insensitive. Likewise, in some implementations, the query term can be normalized by removing punctuation marks such that, for example, the query term "jd" can match "J.D." The document in the query-document pair can include a document (e.g., an HTML document) or a reference to a document, the reference being a uniform resource locator (URL). The query and the URL are paired because the query performed well for the resource located at the URL. For example, the particular resource at the URL "www.bibliophilia.com/author.jsp?aid=12345" is a known good result. The resource is a known good result if the resource has been selected relatively frequently by multiple users from various query result sets according to historical data that have been collected without identifying the users' identities.

The URL in the query-document pair of Box 302 can link to static resource content (e.g., a static HTML document) or dynamic resource content (e.g., an HTML page generated on a server associated with domain name "bibliophilia.com" using JSP). Both static and dynamic content can include dynamic elements (e.g., JavaScript scripts) that, when executed, performs certain tasks, including, for example, generating customized information on a display or making the displayed content responsive to user actions. Both the static and dynamic content can be structured content that includes embedded coding.

Box 304 illustrates an embedded coding fragment identified from the received structured content. A query generating system (e.g., query generation subsystem 120 of FIG. 2) can include various rules for extracting fragments of structures (e.g., embedded coding fragments) from the received structured content. For example, a rule can specify that the query generation system shall identify an embedded coding segment (e.g., content enclosed by a pair of HTML tags, including the tags themselves), if the embedded coding fragment includes the terms of the query, e.g., if the embedded coding fragment includes both "jd salinger" and "redbooks," two terms in the query.

In the example given in box 304, the following tagged text is identified from the structured document (as identified by the URL "www.bibliophilia.com/author.jsp?aid=12345"):

<title>J.D. Salinger Books Bio Highlights|redbooks.com: Style</title>
In this embedded coding, segment 306 "J.D. Salinger" and segment 308 "redbooks" match the query terms. The rule can specify that the tags enclosing the segments 306 and 308, and all the enclosed text, be extracted as an embedded coding fragment.

Based on the embedded coding fragment, the query generation system creates a candidate query template. In some implementations, the candidate query template can include the generation rules to generate candidate synthetic queries. For example, a candidate query template "candidate query template 1" can specify text in the position of the segments 306 and 308 for embedded coding fragments of similar structure be extracted from documents.

TABLE 1 an example candidate query template generative rule pseudo-code

Query Template 1 Generative Rule
Segment 1: starting from the beginning of the tag until a fixed marker (e.g., a text segment that starts from immediately after the
tag "<title>" to immediately before the static text "Books Bio Highlights | "
Segment 2: the text in title between "Books Bio Highlights | " and
".com: Style</title>"

Box 310 illustrates an application of the query template to other structured documents. Applying the query template to other structured documents can include identifying embedded coding in the other document, the embedded coding being structurally similar to the embedded coding described in the query template. In some implementations, two pieces of embedded coding can be structurally similar when the two pieces of embedded coding are the same except for portions containing the identified segment. For example, in the example given in box 310, the following tagged text is identified from the structured document (as identified by the URL "www.bibliophilia.com/author.jsp?aid=23456"):

<title>H.L. Mencken Books Bio Highlights|blackbooks.com: Style</title>
In this embedded coding, segment 312 "H.L. Mencken" and segment 314 "blackbooks" are in an embedded coding structure that is similar to the structure in which segment 306 "J.D. Salinger" and segment 308 "redbooks" are located. The segments 312 and 314 are thus used to generate a candidate synthetic query "h1 mencken blackbook."

In some implementations, the documents from which the candidate synthetic queries are generated share similar traits with the document from which the query templates are identified. The traits can include being hosted by a common website. For example, the two documents as shown in box 304 and 310 are both hosted on a website identified by domain name "bibliophilia.com."

As will be described below, the candidate synthetic query, after being evaluated for performance against one or more documents (e.g., the document from which the candidate synthetic query is generated), are stored as synthetic queries and be associated with the document from which the new synthetic query is extracted if certain performance thresholds are met. Box 316 illustrates a pair that includes the new synthetic query "h1 mencken blackbook" and the document associated with the new synthetic query (e.g., as identified by the URL "www.bibliophilia.com/author.js- p?aid=23456"). The new synthetic query "h1 mencken blackbook" can be stored in a query store (e.g., query store 116) as a new seed query.

Figure 4:
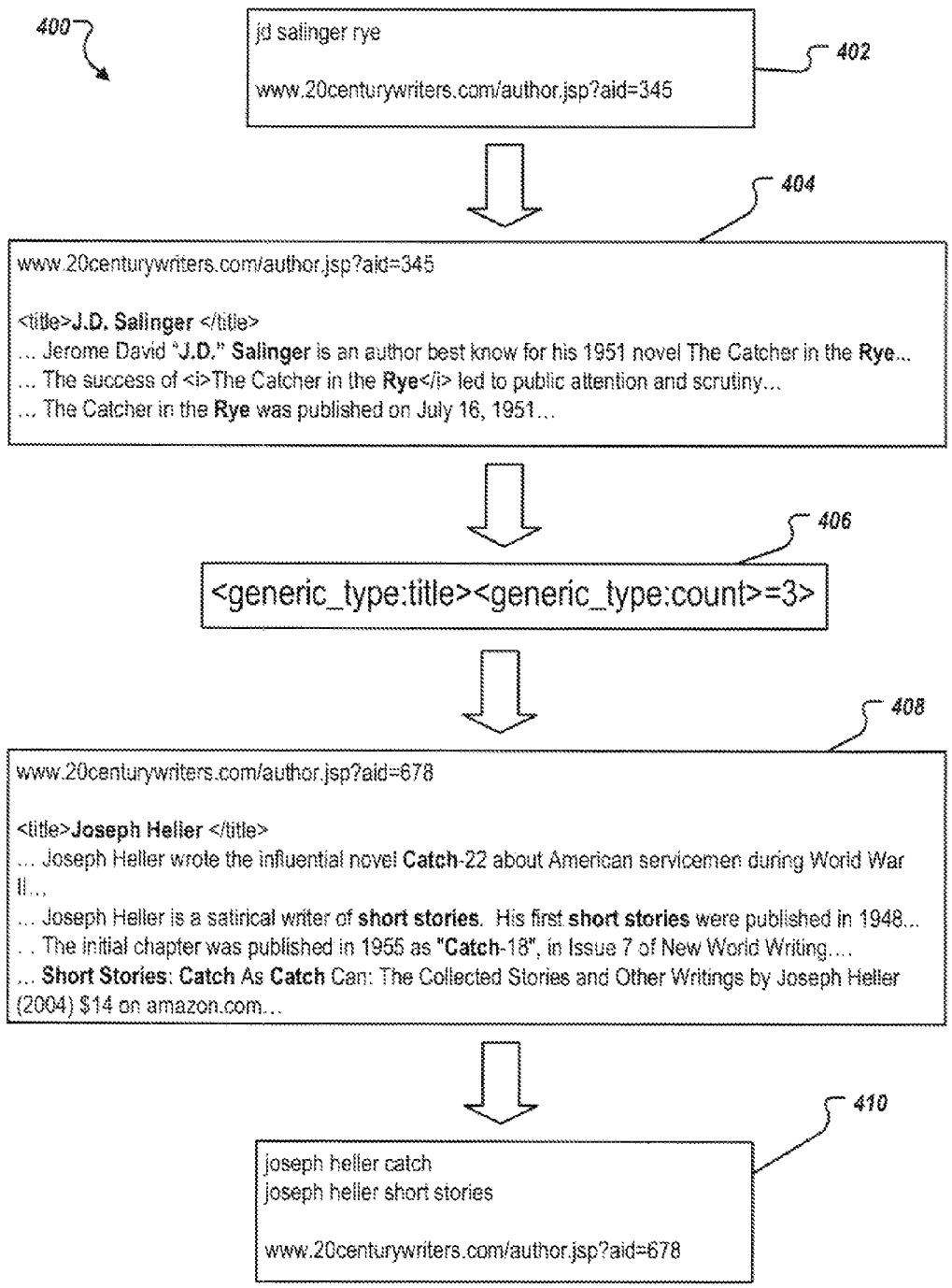
FIG. 4 is a block diagram of example implementations of query generation techniques using structural similarity based on literals based on wildcards.

FIG. 4 is a block diagram 400 of example implementations of query generation techniques using structural similarity based on wildcards. In addition to literals, wildcards can be used in generating synthetic queries. A wildcard can include specific descriptions of where a text segment is located (e.g., in a <title> tag or an <h1> tag), and characteristics specifying how the text segments are located in a document (e.g., a particular segment that has appeared in a document for three times).

Box 402 includes an example query-document pair. The query can be a seed query that includes query terms "jd salinger rye." The query can be associated with a structured document identified by URL "www.20centurywriters.com/author.jsp?aid=345" that is shown to result in "jd salinger rye" being a well-performing query.

Box 404 illustrates matches between the seed query and the structured document that satisfy certain identification rules. Words, phrases, and text segments are identified, and are represented in bold, when:
1. The words, phrases, and text segments appear in both the seed query and the structured document; and
2. The distribution of the words, phrases, and text segments in the structured document matches certain patterns as specified by extraction rules.

The existing seed query and the structured document both include query terms "jd salinger" and "rye." In some implementations, each single word of the query can form a query term. For example, the query terms can include "jd," "salinger," and "rye."

In box 404, distribution of the identified query terms in the structured document can result in identifying embedding coding fragments satisfy various template extraction rules. For example, "jd salinger" and "rye" appear in the document following a pattern that at least one term appears in a title, and at least another term appears three or more times in the document. In various implementations, template extraction rules are specified to capture various patterns on how text appears in a document. Each query-document pair can be associated with numerous template extraction rules. Based on these template extraction rules, candidate query templates can be generated. For example, a template extraction rule can specify that a candidate query template shall be generated if at least a part of the title of the document matches some query terms, and if some query terms appear multiple times in the document.

Box 406 illustrates an example query template generated from the seed query "jd salinger rye" and the document associated with the seed query. The example query template includes two sections: <generic type:title> and <generic type:count=3>, each section defining a structure. The part <generic type:title> indicates that a match between the document and the seed query exists in the <title> tag of an HTML document. The term "generic type" specifies that a type of the component that exists in the <title> tag is a generic type.

A wildcard has the form of <type> or <type:constraint>. The "type" portion can indicate a category of terms. A "generic type" type indicates a most general type that represents either a unigram or a known n-gram. The n-gram (e.g., "new york" or "jd salinger") can be determined by an external process. Other types are possible. The type of text can be determined by an external process. For example, a type can be date, number, or URL. "Generic type" can be a default type when information on other types is unavailable.

The "constraint" portion can indicate a document based context in which the specified type of text appears. The constraint can include a name of an HTML tag (e.g., <h1> or <title>), which indicates that the type of text need to appear in a section of the document that are enclosed by the HTML tag pair. If a wildcard does not have a "constraint" portion (e.g., the wildcard is "<generic type>"), the wildcard can indicate any term that appears anywhere in the document. If the wildcard has a constraint portion that specifies "count>n," the terms are required to appear in the document more than n times. Therefore, for example, the second portion of the query template as shown in box 406 "<generic type:count>=3>" can refer to any term that has a "generic-type" (e.g., "rye") that appears in the document for three times or more, the term matching some portion of the seed query.

The example query template as shown in box 406 contains two sections. Each section contains a wildcard. A query template can include an unlimited number of sections. Each section can be used to generate one or more text segments. The text segments can be concatenated or otherwise joined together to produce a candidate synthetic query.

In some implementations, the query template can be associated with additional constraints based on characteristics of a wildcard. For example, if, during a course of training, a wildcard always (or sufficiently frequently) refers to rare terms (e.g., a term having IDF that is at or above a first threshold value), the wildcard can be configured such that the wildcard is not associated with a common term (e.g., a term having IDF that is at or below a second threshold value).

The query generation system creates the candidate synthetic query by applying the query template (e.g., the query template as shown in box 406) to other documents (e.g., other structured documents hosted on or generated from website "20centurywriters.com"). In box 408, the query generation system identifies portions of structured document identified by the URL "www.20centurywriters.com/author.jsp?aid=678" that match the query template. For example, a first text segment "Joseph Heller" matches the first section of the query template, when the text segment "Joseph Heller" appears in a pair of <title> and </title> tags. Second text segments "short," "stories," "short stories," and "catch" each matches the second section of the query template, because segments "short," "stories," and "short stories" has each appeared three times in the document. The term "catch" appears four times in the document. Concatenating the first text segment and the second text segments, the query generation system can create four candidate synthetic queries: "joseph heller catch," "joseph heller short," "joseph heller stories," and "joseph heller short stories."

In some implementations, the query generation system measures performance in a search environment for each of the candidate synthetic queries. The measurement is used to filter the candidate synthetic queries. In box 410, two synthetic queries ("joseph heller catch" and "joseph heller short stories") remain, and two are discarded, based on performance (e.g., IR scores). The two remaining queries can be designated synthetic queries and stored in a query store. The two newly designated synthetic queries ("joseph heller catch" and "joseph heller short stories" can be stored referencing to the document identified by URL "www.20centurywriters.com/author.jsp?aid=678."

In some implementations, a query generation system combines the literals and wildcards described in FIG. 3 and FIG. 4 to produce query templates. An example query templates that includes both literals and wildcards is described with respect to Tables 2 and 3. Table 2 includes example existing seed queries associated with one or more structured documents (e.g., an example webpage "http://www.winebow.com/wine_producer.asp?producer=643"):

TABLE 2

| High Performance Queries Relating to a Specific Webpage |
| --- |
| valle reale |
| valle real montepulciano |
| montepulciano varietal |
| valle reale abruzzo |
| valle reale wines |
| valle reale winery |
| valle reale winebow |

Table 3 shows an example set of candidate query templates. The query templates can contain one or more sections, and each section can be a literal or a wildcard.

TABLE 3

Example Candidate Query Templates

| Candidate Query Template | Wildcard Portion(s) | Literal Portion |
| --- | --- | --- |
| <generic type:h1> | <generic type:h1> | — |
| <generic type:h1> "montepulciano" | <generic type:h1> | "montepulciano" |
| <generic type:h1> <location:count>=7> | <generic type:h1> <location:count>=7> | — |
| <generic type:count>=7> "winery" | <generic type:count>=7> | "winery" |

§2.4 Example Synthetic Query Generation Workflow

Figure 5:
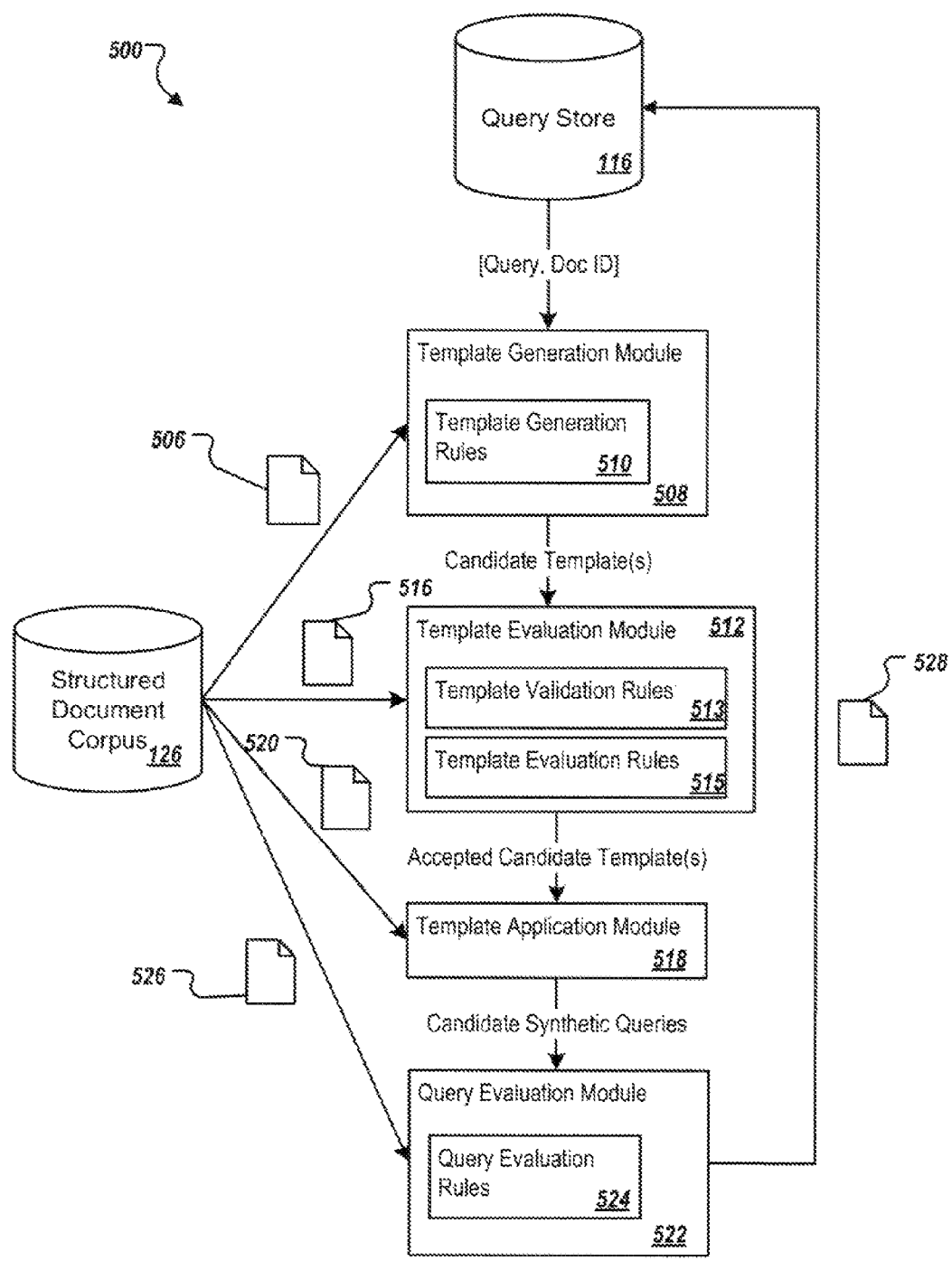
FIG. 5 is a block diagram of various example modules of a query generation subsystem.

FIG. 5 is a block diagram of various example modules of a query generation subsystem 500. The query store 116 stores historical data (e.g., existing seed queries submitted by users in the past, or seed queries that have been synthesized by query generation engine previously).

Template generation module 508 accesses the query store 116 and retrieves query-document pairs. The query in a query-document pair is an existing seed query (e.g., "jd salinger rye"). The document in the query-document pair is a structured document (e.g., an HTML document), or a reference to the structured document. If a reference is used, the reference includes a document identifier (e.g., a hyperlink to an HTML document). Content of the structured document 506 can be retrieved from a structured document corpus 126.

The query store 116 can store a large number of seed queries. Similarly, structured document corpus 126 can include a large number of documents. To effectively generate new synthetic queries, the template generation module 508 selects a subset of seed queries from query store 116 and a subset of structured documents from the corpus 126. In some implementations, the template generation module 508 selects a set of structured documents grouped by one or more common traits (e.g., being hosted on a same website). The template generation module 508 then selects seed queries that have reliably retrieved that set of structured documents. For illustrative purposes, the common trait used for grouping documents is that the documents are hosted on a same website. Other traits can be used. For example, a common trait can be that the documents are from a same author, included in a same journal, or from a same time period.

The template generation module 508 generates one or more candidate query templates from the seed queries and the structured documents in the retrieved query-document pairs. To generate the candidate query templates, the template generation module 508 applies a set of template generation rules 510 to the seed queries and the structured documents. For example, a rule can require that at least a portion of a seed query appear in certain HTML tags embedded in the document (e.g., a <title> </title> tag pair or an <h1> </h1> tag pair). Another rule can require that at least a portion of the seed query appear multiple times in the structured document. These observations of historical data can be used as bases to generate several, several dozen, or several hundred candidate query templates for each query-document pair.

A template evaluation module 512 evaluates the candidate query templates selects from the candidate query templates that satisfy one or more filtering criteria. Evaluating candidate query templates includes:

1. Validating the candidate query templates; and
2. Evaluating the validated candidate query templates.

Validating a candidate query template includes determining whether the candidate query template meaningfully relates to content of the website, or is rare. The candidate query may be rare, for instance, if the candidate query does not appear in at least a threshold number of documents. Evaluating a candidate query template includes determining a likelihood that the candidate query template can generate valid synthetic queries.

In some implementations, a candidate query template is validated only if the candidate query is supported by other documents. The candidate query is supported by the other documents if similar structures in other documents are present in sufficient numbers in other documents in the set (e.g., in documents on the website). To validate a candidate query template, the template evaluation module 512 compares the candidate query template to other structured documents 516 that share some traits with the document in the query-document pair and attempts to identify the query template in the other structured documents. In some implementations, the comparison is performed on HTML documented hosted on or generated from a same website that hosted or generated the original document. The comparison can identify matches, and exclude those templates that have no match or do not have sufficient number of matches in the other structured documents 516. For example, templates that appear in only one document can be designated as unsupported.

To identify and exclude relatively rare query templates, the template evaluation module 512 applies various template validation rules 513. The template validation rules 513 specify a threshold number of appearances for a website. Candidate query templates that appear in the website for more that the threshold number of times are designated as valid query templates. A candidate query template is excluded if a total number of appearances of the candidate query template fail to satisfy the threshold number. The threshold number can vary, depending on a size of the website. In some implementations, the threshold number is proportional to the size of the website. In various implementations, the size of the website is measured by a total number of documents hosted on or generated from the website, or by a sum of document sizes of the website, or a combination of the two.

In some implementations, instead of identifying matching candidate query templates in multiple documents, the template evaluation module 512 calculates a total number of each candidate query template generated from structured documents that share are hosted on the same website. The template evaluation module 512 can determine that a particular candidate query template that is generated from only a single webpage of a website is relatively rare if the total number of the particular candidate query template is one when the website includes multiple webpages. If the total count of appearances of the particular candidate query template satisfies a threshold, the candidate query template is determined to be a valid query template.

In addition to validating the candidate query templates, the template evaluation module 512 further evaluates the validated candidate query templates using template evaluation rules 515. The further evaluation can be performed by applying the candidate query templates to the other structured documents 516. Evaluating the candidate query templates can include aggregating all the candidate query templates, and calculating a template performance score. In some implementations, the template performance score measures how many times the candidate query templates appear in all documents of the website. For example, template evaluation module 512 can apply query template 1 as described above to all documents 516 of the website "www.bibliophilia.com" and count the number of times the structure appears in the website "www.bibliophilia.com."

In some implementations, aggregating candidate query templates the template evaluation includes revising constraints in the candidate query templates while performing the evaluation. Revising the constraints causes structurally similar candidate query templates to be merged together and counted together. A minimum count value can be standardized such that candidate query templates have constraint in common except the minimum count can be unified. For example, template evaluation module 512 can merge two candidate query templates "<generic type:h1> <location:count>=7>" and "<generic type:h1> <location:count>=5>" into a single candidate query template "<generic type:h1> <location: count>=5>."

The template evaluation module 512 then applies a threshold value as defined in template evaluation rules 515. The threshold value is a cut-off value. When the template performance score of a candidate query template (e.g., a count of a candidate query template) satisfies the value, the candidate query template is deemed an acceptable query template. In some implementations, the threshold value is calculated based on a size of the website where documents 506 and 516 are hosted. For example, the threshold value can be a logarithm value of the size of the website plus a constant. Alternatively, the threshold value can also be a fixed number. Candidate query templates that have counts satisfying the threshold are accepted to generate candidate synthetic queries, while the other candidate query templates that fail to satisfy the threshold are discarded.

After validation and evaluation, a template application module 518 applies the remaining candidate query templates to each of structured documents 520 having a same trait (e.g., hosted on a same website). Text content in structures described in the query templates are extracted from structured documents 520. The text content is designated as candidate synthetic queries.

Many candidate synthetic queries can be generated, and not all of them are likely to be well-performing queries. Accordingly, the performance of candidate synthetic queries is measured. The performance can be measured, for example, using an information retrieval (IR) score that measures the relevance of the candidate synthetic query to the structured document from which it was generated. The candidate synthetic queries that measure high in performance, e.g., those that have a performance characteristic that exceeds a threshold, are added to the synthetic query store

116. In operation, the candidate synthetic queries are fed into a query evaluation module 522 for evaluation. The query evaluation module 522 determines which candidate synthetic queries exceed a performance threshold. To make the determination, the query evaluation module 522 calculates a query performance score of each candidate synthetic query. In some implementations, calculating the query performance score of the candidate synthetic query includes calculating IR scores for the candidate synthetic query for a structured document 526 from which the candidate synthetic query is extracted. The IR scores can measure the performance of a candidate query in terms of precision, recall, fall out, among others. In some implementations, calculating the query performance score of the candidate synthetic query further includes adjusting the IR score using the template performance score of the template (as produced by template evaluation module 512) from which the candidate synthetic query is generated. For example, the query evaluation module 522 can calculate the query performance score of the candidate synthetic query by multiplying the IR score of the candidate synthetic query and the template performance score of the template that extracted the candidate synthetic query.

The query evaluation module 522 includes query evaluation rules 524. The query evaluation rules 524 include various formulas for calculating the query performance score, including formulas for calculating and adjusting the IR score, as well as one or more query threshold values. Those queries 528 that are determined to exceed a performance threshold are stored in the query store 116.

§3.0 Query Synthesization Processes

Figure 6:
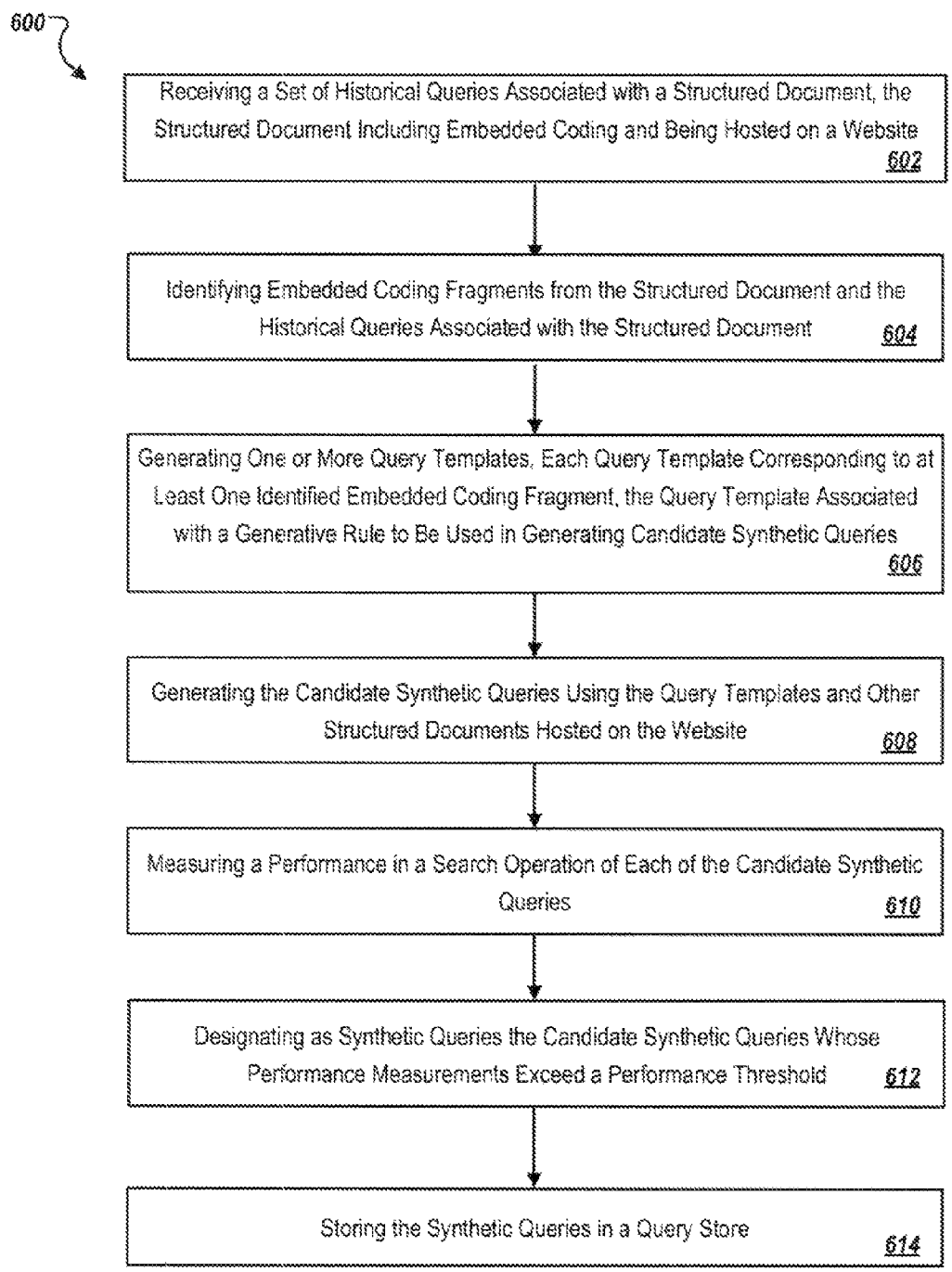
FIG. 6 is a flow diagram of example process of generating synthetic queries using structural similarity between documents.

FIG. 6 is a flow diagram of another example process 600 of generating synthetic queries using structural similarity between documents. For convenience, the example process 600 is described in reference to a system implementing the example process 600. The system can include, for example, the synthetic query subsystem 114 of FIG. 1, or in the query generation subsystem 500 of FIG. 5.

The system receives (602) a set of historical queries associated with a structured document. The structured document includes embedded coding. The embedded coding describes various structures within the structured document. The structured document can include, for example, an HTML document hosted on a website. The embedded coding of the structured document can include HTML tags.

The system identifies (604) embedded coding fragments from the received structured document and the historical queries associated with the structured document. Identifying the embedded coding fragments can include identifying various matches between components of a structure in the document and terms in the historical queries. For example, identifying the embedded coding fragments from the structured document can include identifying an HTML tag pair, where at least a portion of content enclosed by the HTML tag pair matches terms of the historical query. The history query can be known seed queries.

The system generates (606) one or more query templates. Each generated query template includes at least one identified embedded coding fragment. In some implementations, the query template includes a literal, a wildcard, or both. The literal includes a literal word, phrase, or text segment. The wildcard includes a type. The type can indicate a category of terms. In some implementations, the wildcard further includes at least one constraint. The constraint indicates a context within which the terms appear in the structured document. For example, the constraint can describe a pattern of occurrence of content in the document. In some implementations, the context within which the terms appear in the structured document is based on a count of a number of times the terms appear in the structured document.

The query template includes a generative rule to be used in generating candidate synthetic queries. When applied to one or more other structured documents, the generative rule can cause the system to generate one or more candidate synthetic queries from the other structure documents based on the embedded coding fragment included in the query template.

In some implementations, the query templates are validated before being used to generate candidate synthetic queries. To validate a query template, the system calculates a number of other structured documents hosted on the website that match the embedded coding fragment in the query. The system determines whether the number of other structured documents hosted on the website including the embedded coding fragment satisfies a template qualification value. If a positive determination is made, the system generates the query template for the embedded coding fragment.

The system generates (608) the candidate synthetic queries using the query templates and other structured documents hosted on the website. Generating the candidate synthetic queries can include applying the generative rules in the query templates to the other structured documents generate the candidate synthetic queries.

The system measures (610) a performance in a search operation of each of the candidate synthetic queries. To measure the performance of a candidate synthetic query, the system can calculate a query performance score for the candidate synthetic query.

The system designates (612) as synthetic queries the candidate synthetic queries that have performance measurements exceeding a performance threshold. The performance threshold can be a function of the length of the candidate synthetic query. For example, the performance threshold can have a value that is proportional to number of terms in the candidate synthetic query.

The system stores (614) the synthetic queries in a query store. The query store can be implemented as a database, including a relational database, an object oriented database, or an ad hoc database (e.g., a file system). The database can be implemented as a distributed database hosted on one or more storage devices.

Figure 7:
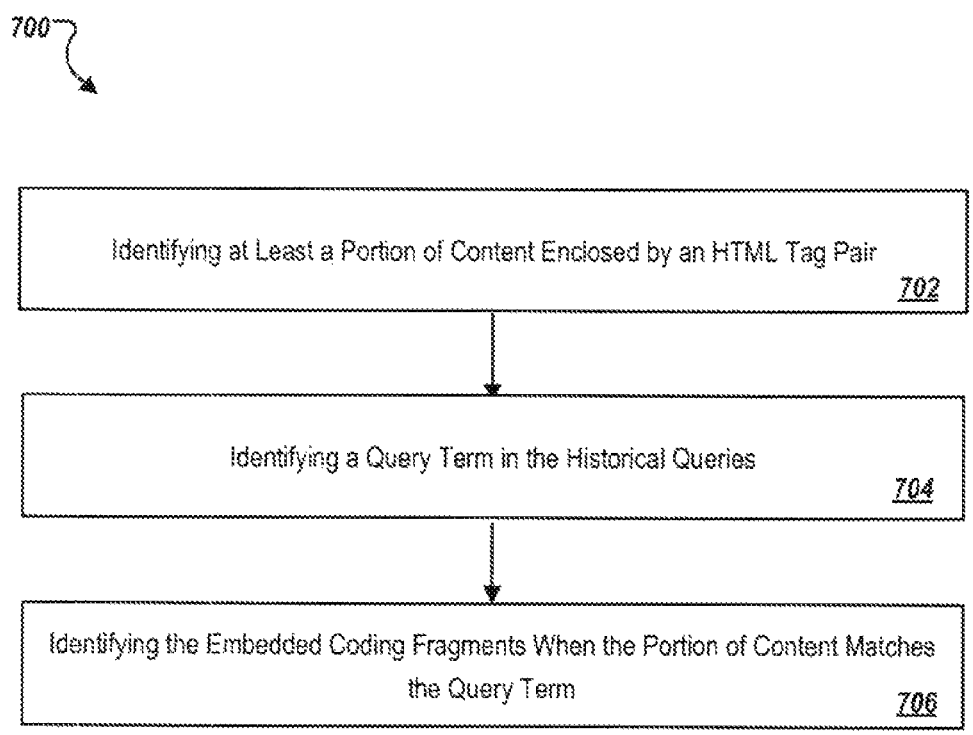
FIG. 7 is a flow diagram of an example process of an example process of identifying embedded coding fragments from a structured document.

FIG. 7 is a flow diagram of an example process 700 for identifying embedded coding fragments from a structured document. For convenience, the example process 700 is described in reference to a system implementing the example process 700. The system can include, for example, the synthetic query subsystem 114 of FIG. 1, or in the query generation subsystem 500 of FIG. 5.

The system identifies (702) at least a portion of content (e.g., a word, phrase, or text segment) enclosed by an HTML tag pair. The system identifies (704) a query term in the historical queries. The system identifies (706) the embedded coding fragments when the portion of content matches the query term.

Figure 8:
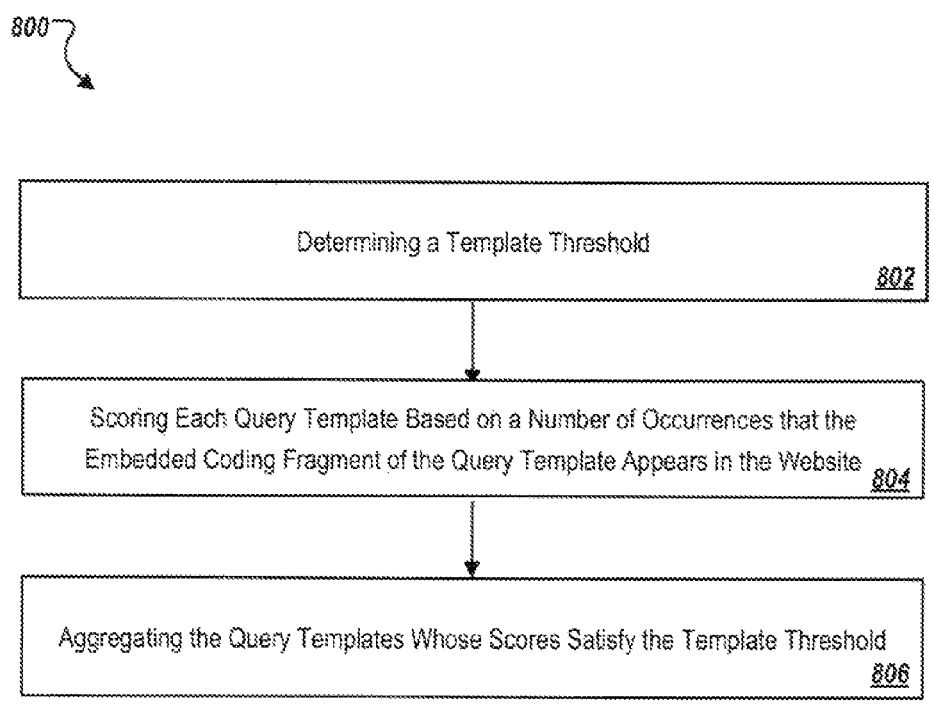
FIG. 8 is a flow diagram of an example process for evaluating candidate query templates for generating synthetic queries.

FIG. 8 is a flow diagram of an example process 800 for evaluating candidate query templates for generating synthetic queries. For convenience, the example process 800 is described in reference to a system implementing the example process 800. The system can include, for example, the synthetic query subsystem 114 of FIG. 1, or in the query generation subsystem 500 of FIG. 5.

The system determines (802) a template threshold. The template threshold can have a value that is proportional to a total number of a total number of structured documents hosted on a website. In some implementations, the total number of structured documents is measured based on a number of document identifiers (e.g., URLs) that contain the same domain name of the website. Determining the template threshold value can include determining the template threshold value based on a logarithmic value of a size of the website.

The system scores (804) each query template based on a number of occurrences that the embedded coding fragment of the query template appears in the website. Scoring the query template can include calculating a template performance score. The system aggregates (806) query templates that have scores satisfying the template threshold. The template threshold can be a function of a size of the website.

Figure 9:
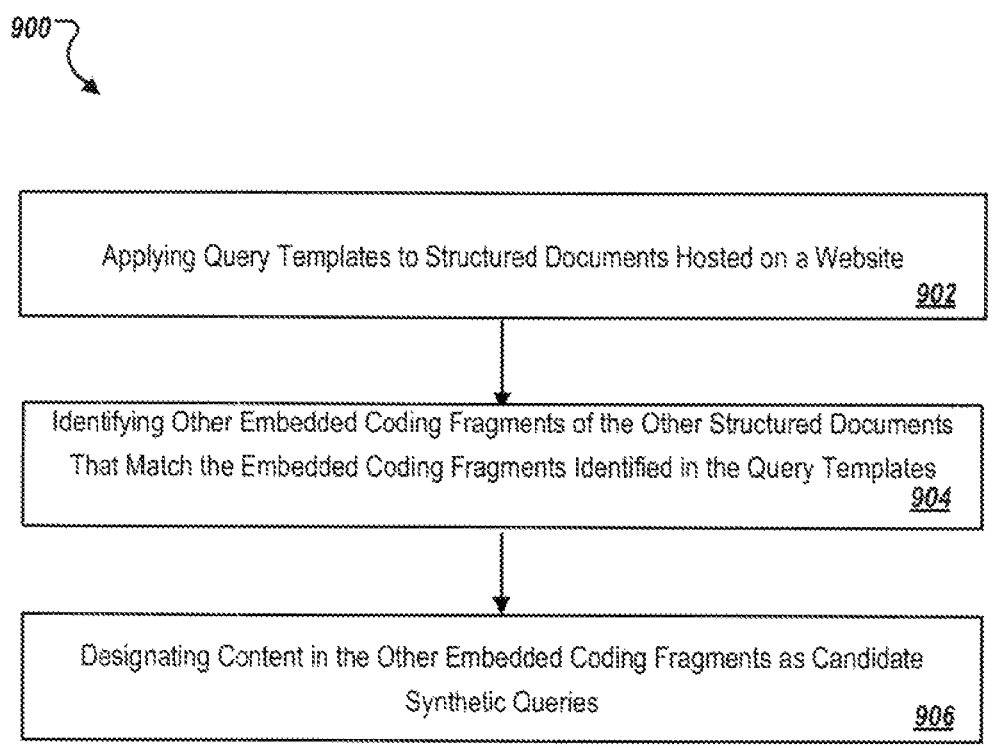
FIG. 9 is a flow diagram of an example process of generating candidate synthetic queries.

FIG. 9 is a flow diagram of an example process 900 of generating candidate synthetic queries. For convenience, the example process 900 is described in reference to a system implementing the example process 900. The system can include, for example, the synthetic query subsystem 114 of FIG. 1, or in the query generation subsystem 500 of FIG. 5.

The system applies (902) query templates generated from a subset of structured documents (e.g., webpages) of a website to other structured documents hosted on the same website. For example, the template application module 518 of FIG. 5 can apply the accepted query templates generated from some structured documents to all structured documents of a website. The structured documents can be identified in structured document corpus 126.

The system identifies (904) other embedded coding fragments of the other structured documents that match the embedded coding fragments identified in the query templates. The other embedded coding fragments can be structures similar to the structures that contain query terms of known well-performing seed queries. As the query terms of known well-performing seed queries appear in a particular structure, the system can determine that content that appears in a similar structure can contain potential well-performing synthetic queries.

The system designates (906) content in the other embedded coding fragments as the candidate synthetic queries. The designated content can include content that appears at similar positions in HTML tags to the positions occupied by the terms of well-performing seed queries in other documents. The system can further evaluate the candidate synthetic queries by calculating query performance scores of the candidate synthetic queries and retain those candidate synthetic queries that have sufficiently high performance scores (e.g., those candidate synthetic queries having performance scores that satisfy a query performance threshold).

§4.0 Utility of Synthetic Queries

Augmentation synthetic queries generated from processes 600, 700, 800, and 900 can be used in augmented searches, as described above with respect to FIG. 1. The synthetic queries also have other applications in addition to being used as input to a search operation. For example, the synthetic queries can be used to identify keywords or phrases for bidding in auctions, as the keywords and phrases of these synthetic queries are from queries that perform well. Likewise, the synthetic queries can be used for selecting advertisements responsive to the received query. For example, an advertisement selection process that uses query keywords and phrases as input can also be used to select advertisements for keywords and phrases from selected synthetic queries.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

A computing system can be implemented in a system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications, and variations to the examples without departing from the scope of the invention.

What is claimed is:

1. A method comprising:
   identifying, by one or more computers, a seed query for a structured document based on a performance of the seed query with respect to the structured document;
   identifying, by the one or more computers, a structure of a portion of the structured document that includes at least one term of the seed query;
   generating, by the one or more computers, a query template that specifies the structure and a portion of the structure from which text should be extracted;
   generating, by the one or more computers, one or more synthetic queries using the query template and one or more other structured documents, the generating comprising:
      identifying a portion of a particular structured document that includes the structure specified by the query template; and
      generating a synthetic query using text contained in the portion of the structure of the particular structured document specified by the query template; and
   storing, by the one or more computers, the one or more synthetic queries in a query store.

2. The method of claim 1, wherein the query template includes a generative rule that specifies the portion of the structure from which text should be extracted.

3. The method of claim 1, further comprising:
   receiving a query;
   identifying a stored synthetic query that includes a term that matches a term of the received query;
   identifying a search result to provide in response to the query based on the identified stored synthetic query; and
   providing data that initiates presentation of the search result.

4. The method of claim 1, further comprising:
   receiving a query;
   identifying a stored synthetic query that includes a term that matches a term of the received query; and
   providing data that initiates presentation of the identified stored synthetic query as a potential query refinement for the query.

5. The method of claim 1, wherein the structure comprises a pair of markup tags.

6. The method of claim 1, further comprising identifying the one or more other structured documents based on the one or more other structured documents being hosted on a same domain as the structured document.

7. The method of claim 1, wherein generating the query template comprises:
   identifying a number of structured documents that include the structure; and
   generating the query template in response to the number of structured documents that include the structure satisfying a template qualification value.

8. A system, comprising:
   a data processing apparatus; and
   a memory storage apparatus in data communication with the data processing apparatus, the memory storage apparatus storing instructions executable by the data processing apparatus and that upon such execution cause the data processing apparatus to perform operations comprising:
      identifying, by one or more computers, a seed query for a structured document based on a performance of the seed query with respect to the structured document;
      identifying, by the one or more computers, a structure of a portion of the structured document that includes at least one term of the seed query;
      generating, by the one or more computers, a query template that specifies the structure and a portion of the structure from which text should be extracted;

generating, by the one or more computers, one or more synthetic queries using the query template and one or more other structured documents, the generating comprising:
  identifying a portion of a particular structured document that includes the structure specified by the query template; and
  generating a synthetic query using text contained in the portion of the structure of the particular structured document specified by the query template; and
storing, by the one or more computers, the one or more synthetic queries in a query store.

9. The system of claim 8, wherein the query template includes a generative rule that specifies the portion of the structure from which text should be extracted.

10. The system of claim 8, wherein the operations further comprise:
receiving a query;
identifying a stored synthetic query that includes a term that matches a term of the received query;
identifying a search result to provide in response to the query based on the identified stored synthetic query; and
providing data that initiates presentation of the search result.

11. The system of claim 8, wherein the operations further comprise:
receiving a query;
identifying a stored synthetic query that includes a term that matches a term of the received query; and
providing data that initiates presentation of the identified stored synthetic query as a potential query refinement for the query.

12. The system of claim 8, wherein the structure comprises a pair of markup tags.

13. The system of claim 8, wherein the operations further comprise identifying the one or more other structured documents based on the one or more other structured documents being hosted on a same domain as the structured document.

14. The system of claim 8, wherein generating the query template comprises:
identifying a number of structured documents that include the structure; and
generating the query template in response to the number of structured documents that include the structure satisfying a template qualification value.

15. A non-transitory computer storage medium encoded with a computer program, the program comprising instructions that when executed by a data processing apparatus cause the data processing apparatus to perform operations comprising:
identifying, by one or more computers, a seed query for a structured document based on a performance of the seed query with respect to the structured document;
identifying, by the one or more computers, a structure of a portion of the structured document that includes at least one term of the seed query;
generating, by the one or more computers, a query template that specifies the structure and a portion of the structure from which text should be extracted;
generating, by the one or more computers, one or more synthetic queries using the query template and one or more other structured documents, the generating comprising:
  identifying a portion of a particular structured document that includes the structure specified by the query template; and
  generating a synthetic query using text contained in the portion of the structure of the particular structured document specified by the query template; and
storing, by the one or more computers, the one or more synthetic queries in a query store.

16. The non-transitory computer storage medium of claim 15, wherein the query template includes a generative rule that specifies the portion of the structure from which text should be extracted.

17. The non-transitory computer storage medium of claim 15, wherein the operations further comprise:
receiving a query;
identifying a stored synthetic query that includes a term that matches a term of the received query;
identifying a search result to provide in response to the query based on the identified stored synthetic query; and
providing data that initiates presentation of the search result.

18. The non-transitory computer storage medium of claim 15, wherein the operations further comprise:
receiving a query;
identifying a stored synthetic query that includes a term that matches a term of the received query; and
providing data that initiates presentation of the identified stored synthetic query as a potential query refinement for the query.

19. The non-transitory computer storage medium of claim 15, wherein the structure comprises a pair of markup tags.

20. The non-transitory computer storage medium of claim 15, wherein the operations further comprise identifying the one or more other structured documents based on the one or more other structured documents being hosted on a same domain as the structured document.

* * * * *